Jan. 11, 1927.

H. F. SPENGLER 1,613,914

AUTOMATIC STOP FOR PHONOGRAPHS

Filed Jan. 22, 1925    3 Sheets-Sheet 1

Inventor.
Hugo F. Spengler
By
Attorney

Jan. 11, 1927. 1,613,914
H. F. SPENGLER
AUTOMATIC STOP FOR PHONOGRAPHS
Filed Jan. 22, 1925   3 Sheets-Sheet 2
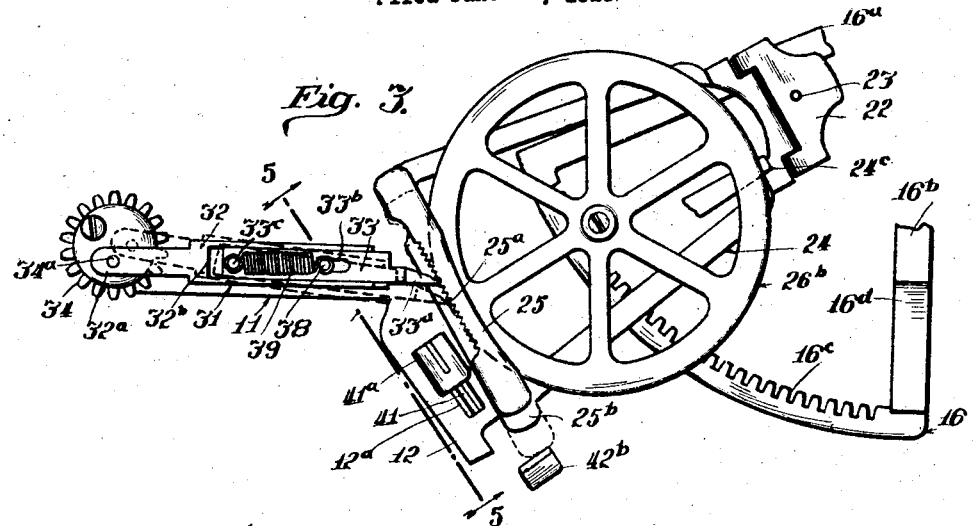
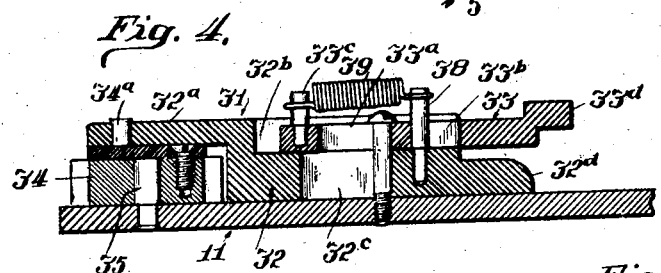
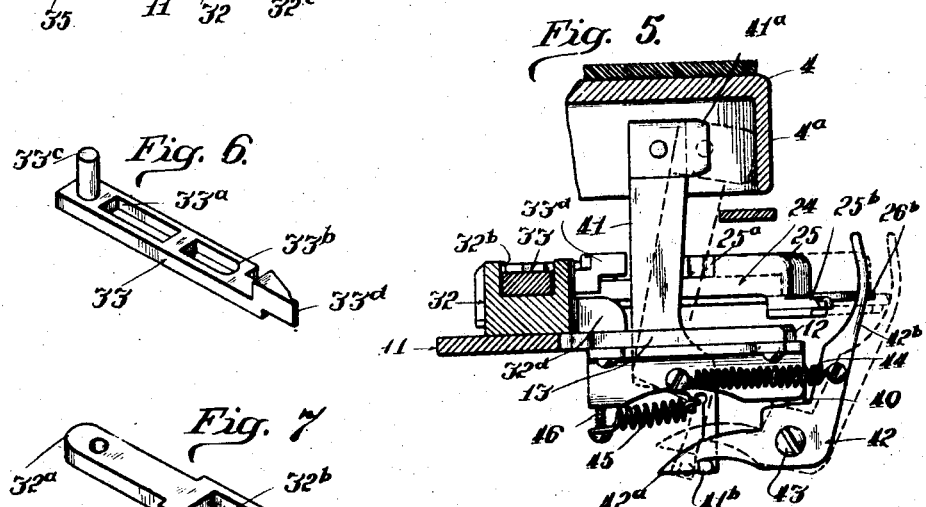
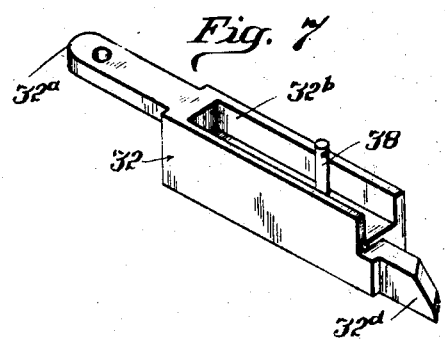
Inventor
Hugo F. Spengler
Attorney Jan. 11, 1927.
H. F. SPENGLER
1,613,914
AUTOMATIC STOP FOR PHONOGRAPHS
Filed Jan. 22, 1925   3 Sheets-Sheet 3
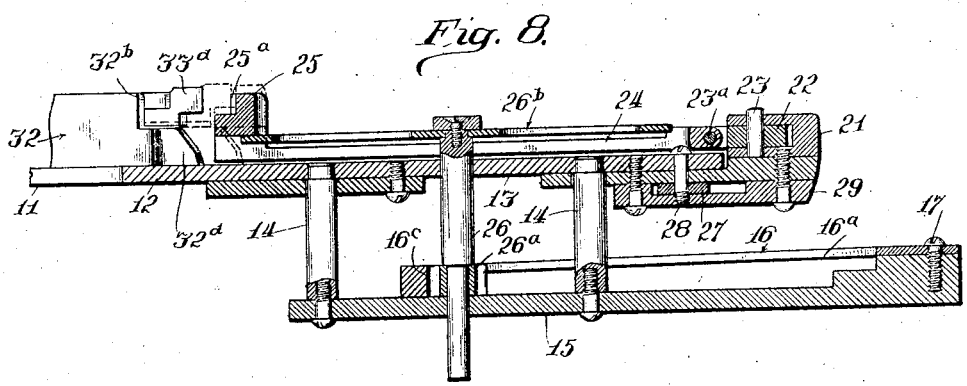
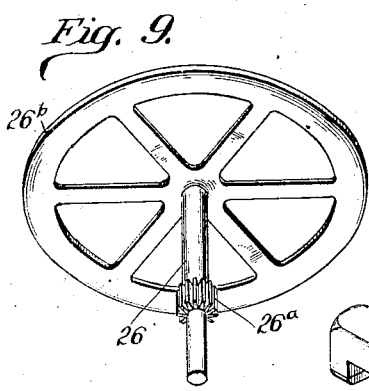
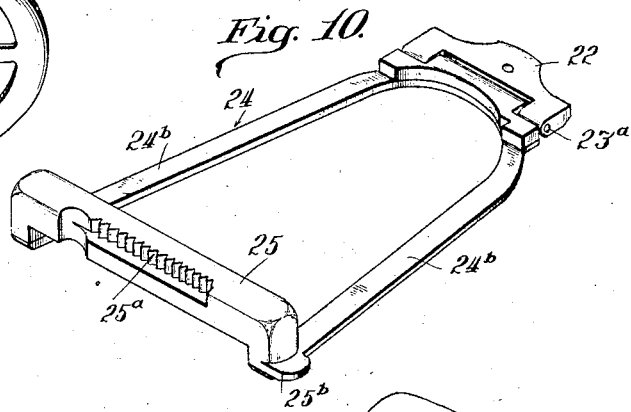
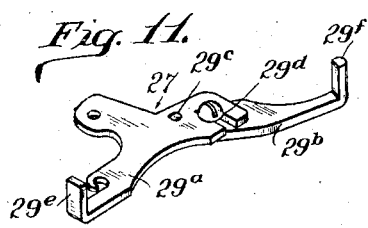
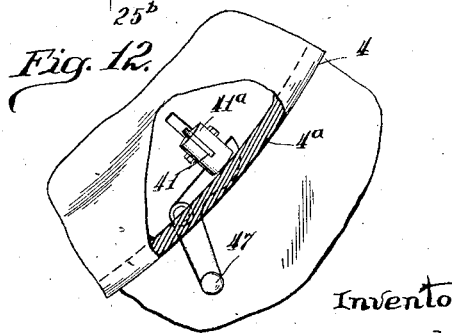
Inventor.
Hugo F. Spengler
By Arthur W. Nelson
Attorney Patented Jan. 11, 1927.

1,613,914

UNITED STATES PATENT OFFICE.

HUGO F. SPENGLER, OF CHICAGO, ILLINOIS.

AUTOMATIC STOP FOR PHONOGRAPHS.

Application filed January 22, 1925. Serial No. 4,116.

This invention relates to improvements in automatic stops for phonographs and consists of the matters hereinafter described and more particularly pointed out in the appended claims.

The primary object of the invention is to provide a simple and positive mechanism which will automatically stop the rotation of the turn table when the last groove of the record being played is reached by the stylus.

A further object of the invention is to provide an automatic stop which need not be set with reference to the record and which will stop the rotation of the turn table when the last groove thereof about the title space of the record has been reached, no matter what its diameter may be and no matter whether the same be concentric or eccentric.

Still another object of the invention is to so arrange the various parts thereof beneath the motor board, that none of said parts are visible or easily accessible for tampering therewith.

These objects of the invention as well as others, together with the many advantages thereof will more fully appear as I proceed with my specification.

In the drawings:

Fig. 3 is an enlarged view of parts shown in Fig. 2, with some of said parts in a changed relation.

Fig. 4 is a detail vertical section on an enlarged scale as taken on the line 4—4 of Fig. 2.

Fig. 5 is a vertical detail sectional view on the line 5—5 of Fig. 3 and shows the brake shoe and trip mechanism therefor.

Figs. 6 and 7 are detail views in perspective of parts of a reciprocating pawl or dog embodied in my improved mechanism and which will be more fully referred to later.

Fig. 8 is a detail vertical sectional view as taken on the line 8—8 of Fig. 2.

Figs. 9, 10 and 11 are detail perspective views of several of the parts embodied in my improved mechanism and which will be more fully referred to later.

Fig. 12 is a detail view showing the parts for resetting the brake shoe after having been tripped to stop the turn table.

Referring now in detail to that embodiment of the invention illustrated in the accompanying drawings:—

Figure 1:
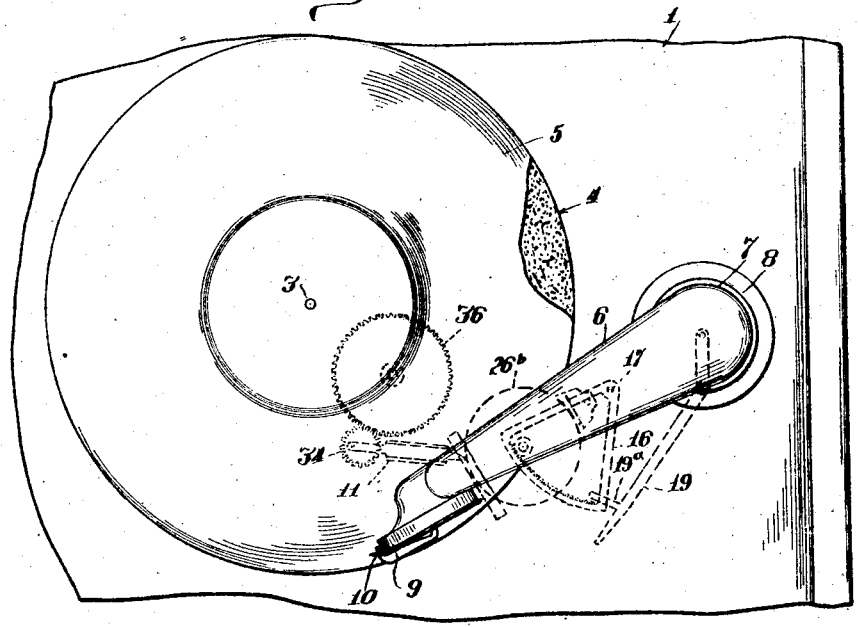
Fig. 1 is a top plan view of disc record phonograph embodying my invention.
Figure 2:
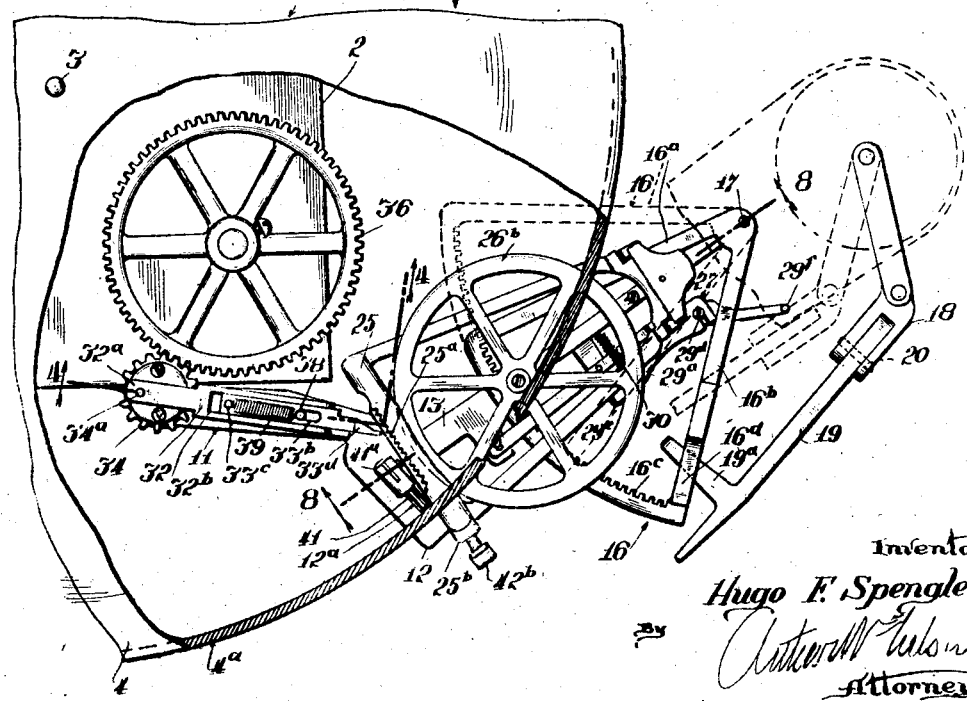
Fig. 2 is a top plan view on an enlarged scale of my improved mechanism which is arranged beneath the motor board of the phonograph.

1 indicates the top wall or motor board of a phonograph cabinet beneath which is arranged the usual motor, a part 2 of which is shown in Fig. 2. Said motor is adapted to drive an upright spindle 3 upon which is mounted the turn table or support 4 for a sound record or disc 5, the last sound groove of which terminates at or near the boundary or periphery of the usual title space at the center of records of this kind.

6 indicates the tone arm of the phonograph which is mounted at one end by means of a ball joint 7 in a socket 8 fixed to the motor board so that said arm may swing in a horizontal plane and also in a short arc in a vertical plane. The other end of the tone arm which is adapted to overhang the turn table carries a reproducing sound box 9 adapted to receive the usual stylus 10 for engagement in the sound grooves of the record. In the playing of a record, as the stylus follows the sound groove, the sound box is caused to swing gradually inward on an arc, toward the center of the record. After the record has been played and stopped as will later appear, the sound box end is lifted upwardly from the record and may then be swung in a reverse direction about the ball and socket joint parts 7 and 8 as an axis so as to be positioned beyond the turn table. The record just played may then be removed and replaced by the next record desired to be played.

Fixed to one side of the frame of the motor 2, below the motor board or top wall is a horizontally disposed plate 11 which includes a lateral extension 12 and a part 13 which extends toward the axis of tone arm 6. Spaced below said plate part 13 and supported therefrom by posts 14—14 is a flat bar 15 which is substantially parallel with said plate part 13. The free end of the flat bar 15 extends beyond the end of the plate part 13 and to said end of said bar is pivoted an open sector-like frame 16 by means of a pin or screw 17 so that said frame may swing in a horizontal plane. Said frame includes angularly disposed side bars 16ª—16ᵇ, the outer ends of which are connected by an arcuate, internal rack bar 16ᶜ. On the side bar 16ᵇ nears its outer end is provided a bracket which includes a part 16ᵈ spaced above the arm 16ᵇ. As the frame 16 is capable of a horizontal swinging movement, I provide an arcuate or curved arm 15ª which extends laterally from the flat bar 15 to form the support for the rack bar part of said frame.

Swinging movement in a horizontal plane is imparted to the frame 16 by means of an arm 18 movable with the tone arm and arranged below the motor board 1. This arm has pivoted to its outer end one end of a lever 19 by means of a horizontal pin 20 so that said lever and arm are capable of a limited relative vertical movement, although said lever will always move horizontally with said arm. The outer end of said lever 19 is bent to extend into the horizontal plane of the open frame 16 so that said outer end will engage the rack bar part of said frame when said lever swings in one direction and will impart a swinging movement to said frame in the same direction. Said lever has a laterally extending hook 19ª which overhangs the member 16ᵇ of said frame beneath the bracket 16ᵈ. This hook is made comparatively long so that a certain amount of lost motion of the lever 19 is provided for before it positively actuates said open frame 16. This lost motion between the parts is of utility because it permits the tone arm to be swung inwardly to bring the stylus into playing position with the starting groove of the record when the same is one of the larger records without imparting movement to the open frame. However, should the record be one of the smaller ones, say a ten inch record, then the lever 19 will actuate the frame and move the same a distance which will compensate for the difference in diameters of the records being played. When the tone arm is given a slight vertical movement as when removing it from a played record, the lever 19 will swing about the pivot 20 and the engagement of the hook 19ª under the bracket 16ᵈ will prevent complete separation between the parts.

On the free end part of the plate part 13 is fixed a bifurcated bracket 21 in which a block 22 is pivoted for movement about a vertical axis or pin 23. To said block is pivoted one end of an open frame 24 by means of a horizontal pin 23ª so that said frame is capable of movement in both a horizontal and a vertical plane. This open frame which is positioned above the plate 13 comprises, as shown in Fig. 10, side arms 24ª—24ᵇ, the outer ends of which are connected by a crossbar portion 25 which is arranged in a plane above that of said arms. Said bar 25 is provided between its ends with ratchet teeth 25ª and is provided at that end connected to the arm 24ᵇ with an extension or tooth 25ᵇ.

Journalled in the plate part 13 and in the flat bar 15, between the posts 14—14 is an upright shaft 26 which is also arranged between the side arms 24ª—24ᵇ of the frame 24. Said shaft, as shown in Figs. 8 and 9, is provided near its bottom end with a pinion 26ª and at its top end with a wheel or disc 26ᵇ. The pinion 26ª is adapted to be engaged by and mesh with the rack bar part 16ᶜ of the frame 16. The wheel or disc 26ᵇ on the top end of the shaft 26 is arranged in a plane between the planes of the arms and rack bar of the frame 24 and said disc is of such a diameter that it overhangs the arms 24ª—24ᵇ and projects under the rack bar part 25 so that said rack bar normally bears or rests upon the peripheral part of said disc.

A bell crank lever 27 (see Fig. 11) is pivoted on a vertical pin 28 fixed in the plate part 13, a bracket 29 (see Fig. 8) which is fixed to the underside of the plate part 13 holding the same in desired position relative thereto. Said bell crank lever comprises two parts 29ª—29ᵇ which are pivoted together at 29ᶜ and may be locked together in the desired relative position by means of a screw and slot construction 29ᵈ as best shown in Fig. 11. The lever part 29ª includes an upright stud 29ᵉ which is adapted to engage one edge of the side bar 24ᵇ of the frame 24, said parts being normally held in engagement by means of a spring 30 connecting the plate part 13 with the lever arm part 29ª. The other lever arm part 29ᵇ also includes an upright stud 29ᶠ which extends into the horizontal plane of the arm 18 carried by the tone arm as before mentioned. When the arm 18 is spaced from or not engaged with the stud 29ᶠ, the stud 29ᵉ will under the action of the spring 30 tend to swing said frame in a clockwise direction, but when said arm 18 is engaged with said stud 29ᶠ as the tone arm moves under the action of the record, said stud 29ᵉ is held away from the frame 24 even against the action of the spring 30 so that the motive action of said spring is discontinued.

Movement is imparted to the frame in a counter clockwise direction by means of a pawl or dog mechanism 31, best shown in Figs. 3, 4, 6 and 7. Said pawl or dog comprises an elongated reciprocating block 32 and a yieldable pawl member 33. The block 32 has one end part 32ª which overhangs a pinion 34 journalled on an upright stud 35 fixed in the member 11 and said end part 32ª is connected to an eccentric pin 34ª on said pinion so that a reciprocating movement will be imparted to said block by the rotation of said pinion. Said pinion may be driven in any suitable manner but in this instance I have shown the same as meshing with and driven by a gear 36 driven by the motor 2. In the top surface of said block 32 is provided a recess 32ᵇ in which the pawl 33 has sliding bearing. A vertically extending slot 32ᶜ is also provided in said block and opens into the recess 32ᵇ. The pawl 33 is provided with two longitudinally spaced slots 33ª—33ᵇ between its ends and a screw 37 passes through the slot 33ª of the pawl and through the slot 32ᶜ of the block and is threaded into the member 11 before referred to so that in the reciprocation of said block, a slight swinging movement is also imparted thereto. A pin 38 extends through the slot 33ᵇ and into the block 32 and a spring 39 connects the pin 38 with a second pin 33ᶜ on one end of the pawl 33, as best shown in Fig. 4. The other end of the pawl is provided with a tooth 33ᵈ which is adapted to coact with the teeth 25ª on the cross bar of the frame 24.

That end of the block 32 below the tooth 33ᵈ is formed to provide a cam portion 32ᵈ which in the forward reciprocation of the block 32 is adapted to engage the bottom portion of the crossbar 25 and to lift the frame 24 upwardly about the pin 23ª as an axis so that said block is elevated into a plane above that of the disc or wheel 26ᵇ when said frame is moved by the pawl 33 in a counter-clockwise direction. A stud 24ᶜ near the pivoted end of the frame, and carried on an adjustable bar 24ᵈ suitably supported from the plate part 13, is adapted to be engaged by a fixed part of the frame 24 to limit its clockwise movement either under the action of the lever 27 or the disc 26ᵇ.

The tooth 25ᵇ on the frame 24 is adapted to actuate a braking mechanism for stopping the rotation of the turntable and such a mechanism is as follows:—Depending from portion 12 of the plate 11 is a bracket 40 to which a brake lever 41 is pivoted at a point between its ends, as best shown in Fig. 5. The top or longer arm of said lever extends upwardly through a slot 12ª in said portion 12 and on the extreme top end of said arm is carried a brake shoe 41ª usually of leather and which is adapted to be engaged with and disengaged from the usual depending flange 4ª on the turntable. The bottom and shorter end of the brake lever carries a laterally extending stud 41ᵇ with which a latch 42ª on a bell crank trip lever 42 is normally engaged. Said trip lever is pivoted at 43 on the bracket 40 and its long arm 42ᵇ extends upwardly into the plane of and adjacent the tooth 25ᵇ on the frame 24.

A contractile coiled spring 44 connects the long arm 42ᵇ of the trip lever with the screw by means of which the brake lever is pivoted to the bracket 40 and said spring normally acts to hold the latch 42ª of the trip lever in engagement with the stud 41ᵇ on said brake lever. A second contractile coiled spring 45 connects the short arm of the brake lever 41 with a pin or screw 46 on the bracket 40 which spring normally tends to urge the brake shoe 41ª into braking engagement with the turntable flange, said tendency being resisted or held in check by the latch 42ª of the trip lever. After the brake lever is released and has engaged the turn table flange 4ª to stop the turn table, it may be reset by means of an L-shaped lever 47 which, as best shown in Fig. 12 is arranged on top of the motor board 1.

Assume that a record has been placed upon the turntable which, of course, is being driven or rotated under the action of the motor 2. The sound box is manipulated to bring the stylus into engagement with the starting groove of the record. As the tone arm is caused to swing inwardly toward the center of the record, the arm 18 and lever 19 attached thereto will also swing in the same direction. During the playing of the record and the movement of the tone arm, as before mentioned, the block 32 is, of course, reciprocated and at the same time given a back and forth swinging movement by the pinion 34. In this movement of said block its cam end 32ᵈ will engage under the cross bar 25 of the frame and will lift it off of the wheel or disc 26ᵇ and simultaneously therewith the yielding pawl 33 will engage one of the teeth 25ª on the bar 25 of the frame 24 and will move it the distance of about two teeth 25ª toward the trip lever 42 but not into engagement therewith. As the block 32 recedes and the pawl 33 is withdrawn, the cross arm 25 again is lowered and is returned to its original position by the action of the spring actuated lever 27 because of the engagement of the studs 29ᶜ thereof with the side member 24ᵇ of the frame 24. The return movement of the frame is limited by the stop 24ᶜ before mentioned. When the tone arm has swung inwardly far enough to cause the engagement of the outer end of the lever 19 with the adjacent corner of the open frame 16, further movement of said tone arm and lever will cause the frame 16 to move in a clockwise direction and impart a like movement to the wheel or disc 26ᵇ. When this condition occurs, the disc 26ᵇ will assist in the return movement of the frame by reason of the frictional engagement of the crossbar 25 on the marginal part of the disc. When the arm 18 engages the stud 29ᶠ of the bell crank lever 27, it will act to swing the said lever about its pivot 28 so that the stud 29ᵉ moves away from the frame and is held in this position against the action of the spring 30. Thereafter, as long as movement is imparted to the frame 16 by the lever 19, the wheel or disc alone acts by frictional engagement with the cross bar 25 to return the frame 24 to its original position. Thus, each time the frame 24 is moved in one direction (counter clockwise) by the pawl 33 it is returned in the other direction (clockwise) by the wheel or disc 26$^b$. By reason of the two part construction of the lever 27, as before described, the relative position of the posts or studs 29$^e$—29$^f$ may be changed so that the operation of said lever with reference to its disengagement from the frame may be accurately timed.

As long as the tone arm is moving inwardly under the action of the stylus following the sound groove of the record, the wheel or disc 26$^b$ is being continuously and evenly rotated by the open frame 16 and when the frame 24 is moved in one direction by the pawl mechanism 31 it is returned to its original position by said disc, the engagement between the cross bar 24 and disc 26$^b$ being of such a duration as to insure a positive return of the frame 24 by the frictional engagement between said cross bar and disc, the former being made of steel and the latter of brass.

When the stylus has reached the concentric groove about the title space of the record, the swinging movement of the tone arm is, of course, discontinued or ceases and when this occurs, said tone arm can impart no further movement to the frame 16 or disc or wheel 26$^b$. Thus, the pawl mechanism 31 is caused to lift the bar and feed it counterclockwise a distance equal to the throw of the pawl member 33. Upon the withdrawal of said pawl for its next reciprocation, the bar 25 rests upon the now non-rotating disc and upon the next forward movement of the pawl, the tooth 25$^b$ engages the trip lever arm 42$^b$ and forces it outwardly, so that its latch 42$^a$ releases the bottom end of the brake lever, which under the action of the spring 45 swings the brake shoe end of the lever 41 outwardly so that the brake shoe 41$^a$ engages the turn table flange and stops the rotation of the same. When the tone arm is lifted and swung in the opposite direction to clear the record so that the same may be removed, the hook 19$^a$ will engage the member 16$^b$ of the frame 16 and return it to normal starting position. A new record is then placed upon the turn table, and the lever 47 is actuated to reset the brake lever 41 with reference to the trip lever, after which the turn table starts rotating and the stylus is then engaged in the starting groove of the record and the operation is repeated, as before described.

It is to be noted, that the tone arm in its swinging movement in one direction is employed to actuate a part of the stop mechanism and that the motor itself actuates the other part of the mechanism.

Some records are provided near the title space with an eccentrically arranged groove, the purpose of which is to actuate certain forms of stops made especially for use in connection with such records. Such stops are inoperative when used with records of the kind not provided with such a groove so that the purchaser is limited to the use of one kind of a record only. My improved stop is operative no matter what type of record is used. For instance, should an eccentric record groove record be played the operation will be as follows:—The stylus would be placed in the starting groove in the usual manner and in the rotation of the record the tone arm will swing across the record until the last active sound groove is reached. As the stylus enters the eccentric groove, the tone arm will swing over a distance equal to the eccentricity of said groove and then back again, the lost motion connection provided by the hook 19$^a$ of the lever 19 being sufficient to accommodate for said eccentricity without imparting a movement to the disc or wheel 26$^b$ as the tone arm is swung back and forth by reason of the movement imparted to it through the said eccentric groove and stylus. Thus, with the disc 26$^b$ stationary or non-rotative the pawl 31 is free to act in the manner before described to actuate the trip lever 42 to release the brake. Thus, it is apparent that my improved stop mechanism is not dependent for its positive operation upon either an initial or previous setting or upon the use of a particular kind of a record.

Actual operation of the device shows that no appreciable "drag" is placed on the record due to the actuation or movement of the pawl operated by the tone arm. No matter what the diameter of the concentric groove about the title space of the record being played may be, the rotation of the record is stopped when the stylus reaches said groove.

The lever 27 is indeed of importance because should the record being played be of such a diameter that when the stylus is placed in the starting groove thereof and the lever 19 is out of engagement with the frame 16, the said lever returns the frame 24 to its original position each time it is moved by the pawl mechanism 31. If no such means were provided, the frame bar part 25 would be caused to engage the trip lever 42 and trip the brake shoe before the turn table was fairly started.

My improved stop, is positive and is of the non-set type; is simple in construction and is so arranged that the stop mechanism may be readily assembled as a whole before being positioned in the phonograph.

While in describing my invention I have referred to certain details of construction and arrangements of parts, the same is by way of illustration only and I do not wish to be limited thereto except as may be pointed out in the appended claims.

I claim as my invention:

1. An automatic stop for phonographs embodying therein in combination with a rotative record support, a tone arm and a brake mechanism for said support, means capable of an initial and final movement for actuating said brake actuating mechanism, means operable in the movement of the tone arm over the record for permitting only the initial movement of said brake actuating mechanism, and means operable when the tone arm reaches the end of the record to permit the final movement of the brake actuating mechanism for stopping the rotation of said support.

2. An automatic stop for phonographs embodying therein in combination with a rotative record support, a tone arm and a brake mechanism for said support, means for actuating said brake mechanism, means for initially preventing operation of said brake actuating mechanism, means for rendering a part of said initial preventing means inoperative, and other means preventing operation of said brake actuating means, said other means becoming inoperative when the tone arm reaches a predetermined position, whereby said brake actuating mechanism operates to stop rotation of said record support.

3. An automatic stop for phonographs embodying therein in combination with a rotative record support, a tone arm and a brake mechanism for said support, means for actuating said brake mechanism, means for initially preventing operation of said brake actuating mechanism, means rendering a part of said initial preventing means inoperative, other means operative upon said part of said initial preventing means becoming inoperative to maintain said initial preventing means operative, and means operative when the tone arm reaches a predetermined position to permit said brake actuating mechanism to complete its movement to actuate said brake to stop said rotating support.

4. An automatic stop for phonographs embodying therein, in combination with a rotative record support, a tone arm and a brake mechanism for said support, means for actuating said brake mechanism, means preventing complete operation of said brake actuating mechanism, a member carried by the tone arm and engaging said last mentioned means when the tone arm reaches a predetermined position, means operable when the tone arm reaches said position to bring another means into operation to still prevent complete operation of said brake actuating mechanism, and means operable when the tone arm reaches a second predetermined position to permit complete operation of said brake actuating means.

5. An automatic stop for phonographs embodying therein, in combination with a rotative record support, a tone arm and a brake mechanism for said support, a reciprocating member adapted to actuate said brake mechanism, means for reciprocating said member in one direction to actuate said brake mechanism, a spring pressed lever and rotary member acting to move said reciprocating member in the opposite direction before it reaches said mechanism, means operative when the tone arm reaches a predetermined position to render said lever inoperative without affecting said rotary member, and means operable when the tone arm reaches a second predetermined position to render said rotary member inoperative so that said reciprocating member engages and actuates said brake actuating mechanism.

6. An automatic stop for phonographs embodying therein, in combination with a rotative record support, a tone arm and a brake mechanism for said support, a reciprocating member adapted to actuate said brake mechanism, means for reciprocating said member in one direction to actuate said brake mechanism, a spring pressed lever and rotary member acting to move said reciprocating member in the opposite direction before it reaches said mechanism, and means carried by and movable with the tone arm for engaging and rendering said lever inoperative when said tone arm reaches a predetermined position, without affecting said rotary member, and means operable when the tone arm reaches a second predetermined position to render said rotary member inoperative so that said reciprocating member engages and actuates said brake actuating mechanism.

7. An automatic stop for phonographs embodying therein, in combination with a rotative record support, a tone arm and a brake mechanism for said support, a reciprocating member adapted to actuate said brake mechanism, means for reciprocating said member in one direction to actuate said brake mechanism, a spring pressed lever and rotary member acting to move said reciprocating member in the opposite direction before it reaches said mechanism, an arm carried by and movable with the tone arm for engaging and rendering said lever inoperative when said tone arm reaches a predetermined position, means interposed between said arm and rotary member for imparting rotation thereto, and means operable when the tone arm reaches a second predetermined position to stop further rotation of said rotary member so that said reciprocating member engages with and actuates said brake actuating mechanism.

8. An automatic stop for phonographs embodying therein, in combination with a rotative record support, a tone arm and a brake mechanism for said support, a reciprocating member adapted to actuate said brake mechanism, means for reciprocating said member in one direction to actuate said brake mechanism, a spring pressed lever and rotary member acting to move said reciprocating member in the opposite direction before it reaches said mechanism, an arm carried by and movable with the tone arm for engaging and rendering said lever inoperative when said tone arm reaches a predetermined position, means including a lost motion connection between said arm and rotary member for imparting rotation to said rotary member, said means becoming inoperative when the tone arm reaches a second predetermined position so that said reciprocating member engages with and actuates said brake actuating mechanism.

9. In a device of the kind described, the combination of an open frame having a rack bar at one end and a universal joint at its other end, a rotary member adapted to normally engage under said rack bar, a pawl mechanism adapted to engage said rack bar to impart a movement in one direction thereto and to simultaneously elevate the same from said rotary member, said rack bar at the end of the stroke of said pawl again engaging said rotary member and being returned to its starting position thereby.

10. In a device of the kind described, the combination of an open frame having a rack bar at one end and a universal joint at its other end, a rotary member adapted to normally engage under said rack bar, means for imparting a predetermined number of rotations to said rotary member, a pawl mechanism adapted to engage said rack bar to impart a movement thereto and to simultaneously elevate the same from said rotary member, said rack bar at one end of the stroke of said pawl again engaging said rotary member and being returned thereby to its starting position, said pawl feeding the rack bar forwardly a greater distance after the rotation of said rotary member has ceased.

11. An automatic stop for phonographs comprising in combination with a record support, a tone arm and a brake mechanism for said support, means for actuating said brake mechanism comprising an oscillatable frame, means for moving said frame in one direction, a lever movable with said tone arm for moving said frame in the other direction, a rotative disc, means for driving said disc and for rendering said lever inoperative after which said disc acts to move said frame in the said other direction, said rotative disc becoming inoperative when the tone arm reaches a predetermined position so that said first mentioned means may operate said brake mechanism.

In testimony whereof, I have hereunto set my hand, this 13th day of January, 1925.

HUGO F. SPENGLER.